United States Patent
Hirose (10) Patent No.: US 9,248,814 B2
(45) Date of Patent: Feb. 2, 2016

(54) VEHICLE BRAKE HYDRAULIC PRESSURE CONTROL APPARATUS

(71) Applicant: NISSIN KOGYO CO., LTD., Nagano (JP)

(72) Inventor: Tomonori Hirose, Nagano (JP)

(73) Assignee: NISSIN KOGYO CO., LTD., Nagano (JP)

( * ) Notice: Subject to any disclaimer, the term of this patent is extended or adjusted under 35 U.S.C. 154(b) by 445 days.

(21) Appl. No.: 13/724,716

(22) Filed: Dec. 21, 2012

(65) Prior Publication Data
US 2013/0184956 A1 Jul. 18, 2013

(30) Foreign Application Priority Data
Dec. 26, 2011 (JP) ................... 2011-283936

(51) Int. Cl.
- *B60T 8/60* (2006.01)
- *B60T 8/1764* (2006.01)
- *B60T 8/50* (2006.01)

(52) U.S. Cl.
CPC ............... *B60T 8/1764* (2013.01); *B60T 8/505* (2013.01)

(58) Field of Classification Search
CPC .................................................. B60T 8/1764
USPC .................. 701/73, 74, 80; 303/149, 150
See application file for complete search history.

(56) References Cited

U.S. PATENT DOCUMENTS

| | | | | |
|---|---|---|---|---|
| 5,520,448 A | * | 5/1996 | Okubo | 303/148 |
| 5,551,769 A | * | 9/1996 | Luckevich | 303/149 |
| 6,318,820 B1 | * | 11/2001 | Usukura | 303/149 |
| 6,880,900 B2 | * | 4/2005 | Hara et al. | 303/170 |
| 2007/0001510 A1 | * | 1/2007 | Miller | 303/149 |
| 2007/0029875 A1 | * | 2/2007 | Kurosaki et al. | 303/187 |
| 2008/0312793 A1 | * | 12/2008 | Schutz et al. | 701/42 |

FOREIGN PATENT DOCUMENTS

| CN | 1246173 C | 3/2006 |
|---|---|---|
| CN | 100503302 C | 6/2009 |

(Continued)

OTHER PUBLICATIONS

U.S. Appl. No. 13/724,707, filed Dec. 21, 2012, not yet published.

(Continued)

*Primary Examiner* — Thomas G Black
*Assistant Examiner* — Peter D Nolan
(74) *Attorney, Agent, or Firm* — Andrew M. Calderon; Roberts, Mlotkowski, Safran & Cole, P.C.

(57) ABSTRACT

A wheel deceleration calculating sections individually calculate, as negative values, wheel decelerations of front and rear wheels. If, at a time when the antilock braking control for at least one of the right and left front wheels is started or at a time when the antilock braking control for at least one of the right and left rear wheels is started, (i) a maximum value of the wheel decelerations calculated by the wheel deceleration calculating sections is equal to or larger than a first predetermined value and (ii) a difference between the wheel decelerations of the right and left front wheels or the right and left rear wheels which are in an antilock braking control state is equal to or larger than a second predetermined value, a split road determining section determines that road surfaces constitute a split road.

3 Claims, 6 Drawing Sheets

(56) References Cited

FOREIGN PATENT DOCUMENTS

| CN | 101622162 A | 1/2010 |
|---|---|---|
| EP | 0878367 A2 | 11/1998 |
| JP | AH01244953 | 9/1989 |
| JP | AH11059386 | 3/1999 |
| JP | 2003089351 | 3/2003 |
| JP | 200755583 A | 3/2007 |
| JP | 2009107614 | 5/2009 |
| JP | 2009214694 | 9/2009 |
| JP | 2011079465 | 4/2011 |

OTHER PUBLICATIONS

Japanese Office Action dated Oct. 9, 2013.
Office Action dated Sep. 6, 2015 in related Chinese Application No. 201210599359.6, 11 pages.

* cited by examiner

Wheel velocities

FIG. 4B

Maximum value of wheel decelerations

FIG. 4C

Difference in wheel deceleration between right and left front wheels

FIG. 4D

Brake fluid pressures

FIG. 5A

Wheel velocities

FIG. 5B

Maximum value of wheel decelerations

0G

First predetermined value

FIG. 5C

Difference in wheel deceleration between right and left front wheels

Second predetermined value

Brake fluid pressures

Lock hydraulic pressure of wheel having weaker friction force
Brake fluid pressure of wheel having weaker friction force
Brake fluid pressure of wheel having stronger friction force t3   t4

FIG. 6A

Wheel velocities

FIG. 6B

Maximum value of wheel decelerations

FIG. 6C

Difference in wheel deceleration between right and left front wheels

FIG. 6D

Brake fluid pressures

VEHICLE BRAKE HYDRAULIC PRESSURE CONTROL APPARATUS

CROSS REFERENCE TO RELATED APPLICATION

This application is based on and claims priority under 35 U.S.C. §119 to Japanese Patent Application No. 2011-283936 (filed on Dec. 26, 2011), the entire contents of which are incorporated herein by reference.

BACKGROUND

1. Technical Field

The present invention relates to a vehicle brake hydraulic pressure control apparatus.

2. Description of the Related Art

JP 2007-55583 A discloses a vehicle brake hydraulic pressure control apparatus that performs antilock braking control, independently from each other, for wheel brakes for right and left front wheels and right and left rear wheels of a vehicle. When the vehicle is running on a split road where coefficients of friction of right and left road surfaces with which the front and rear wheels are in contact are largely different from each other during the antilock braking control, the vehicle brake hydraulic pressure control apparatus of JP 2007-55583 A controls so that a difference between brake fluid pressures of the left and right wheel brakes which is equal to or larger than a predetermined value is not generated.

SUMMARY

In a certain vehicle brake hydraulic pressure control apparatus, it is determined that the road surfaces constitute the split road when a maximum value of wheel decelerations of four wheels, a right front wheel, a left front wheel, a right rear wheel and a left rear wheel, is equal to or larger than a predetermined value, that is, the deceleration of the wheel which is decelerated least (whose deceleration is closest to zero) is equal to or larger than the predetermined value. In making such a determination, however, there is a possibility that an erroneous determination is made the road surfaces constitute the split road even if the road surfaces don't actually constitute the split road and the coefficients of friction of road surfaces with which the right and left wheels are in contact are high, in the event that a tire on one of the right and left wheels wears more than a tire on the other, which may cause a difference in frictional force, which is defined between the tire and the road surface, between the right and left wheels. If the difference between the brake fluid pressures of the right and left wheel brakes is restricted based on the erroneous determination, there is a possibility that the braking performance of the vehicle may be deteriorated.

The invention has been made in view of above circumstances, and provides a vehicle brake hydraulic pressure control apparatus that does not erroneously determine that road surfaces constitute a split road even if there is a difference in frictional force, which is defined between a wheel and the road surface, between right and left wheels of the vehicle.

According to one aspect of the invention, a vehicle brake hydraulic pressure control apparatus includes a hydraulic pressure adjusting unit, a wheel deceleration calculating section, and a split road determining section. The hydraulic pressure adjusting unit individually adjusts brake fluid pressures acting on wheel brakes for right and left front wheels and right and left rear wheels. The wheel deceleration calculating section individually calculates, as negative values, wheel decelerations of the front and rear wheels. The split road determining section determines as to whether or not road surfaces which the right wheels and the left wheels are in contact with constitute a split road in which coefficients of friction of the road surfaces are different from each other. In a state where the split road determining section determines during execution of antilock braking control that the road surfaces constitute the split road, the hydraulic pressure adjusting unit is controlled so that differential pressures between the brake fluid pressures of the right and left wheel brakes are equal to or less than a permissible differential pressure. If, at a time when the antilock braking control for at least one of the right and left front wheels is started or at a time when the antilock braking control for at least one of the right and left rear wheels is started, (i) a maximum value of the wheel decelerations of the front and rear wheels calculated by the wheel deceleration calculating section is equal to or larger than a first predetermined value and (ii) a difference between the wheel decelerations of the right and left front wheels or the right and left rear wheels which are in an antilock braking control state is equal to or larger than a second predetermined value, the split road determining section determines that the road surfaces constitute the split road.

With the above configuration, if, at the time when the antilock braking control for at least one of the right and left front wheels is started or at the time when the antilock braking control for at least one of the right and left rear wheels is started, (i) the maximum value of the wheel decelerations of the front and rear wheels is equal to or larger than the first predetermined value and (ii) the difference between the wheel decelerations of the right and left front wheels or the right and left rear wheels which are in the antilock braking control state is equal to or larger than the second predetermined value, the split road determining section determines that the road surfaces constitute the split road. Therefore, even if the maximum value of the wheel decelerations of the four wheels is equal to or larger than the first predetermined value as a result of a difference in frictional force, which is defined between the wheel and the road surface, between the right and left wheels while the vehicle is running on the road surfaces where the coefficients of friction of the road surfaces with which the right and left wheels are in contact are both high, the difference in wheel deceleration between the right and left front wheels or the right and left rear wheels becomes less than the second predetermined value. As a result, the split road determining section does not erroneously determine that the road surfaces constitute the split road. Also, even if the difference in wheel deceleration between the right and left front wheels or the right and left rear wheels becomes equal to or larger than the second predetermined value while the vehicle is running on the road surface where the coefficients of friction of the road surfaces with which the right and left wheels are in contact are both low, the maximum value of in the wheel decelerations of the four wheels becomes less than the first predetermined value. Therefore, it is not erroneously determined that the road surfaces constitute the split road.

DETAILED DESCRIPTION

Figure 1:
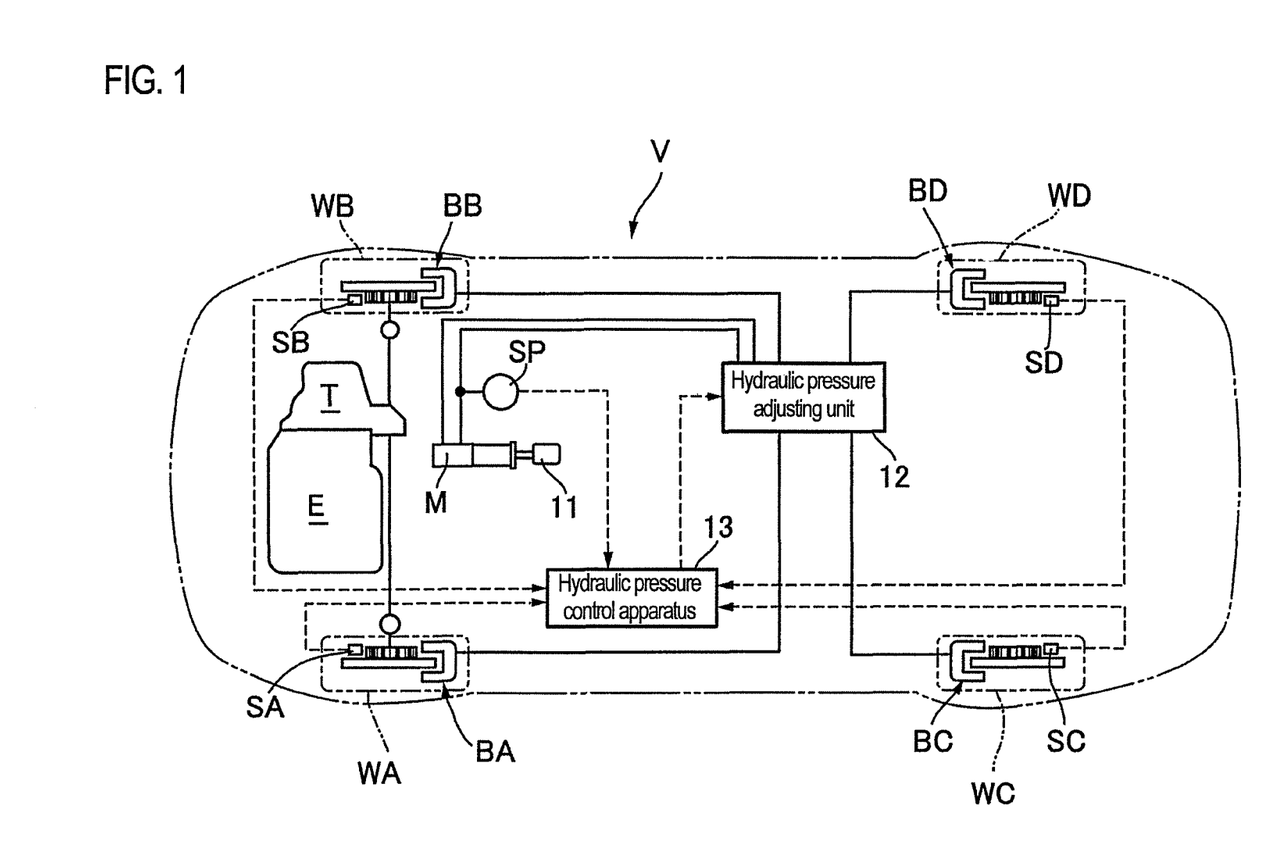
FIG. 1 is a diagram showing a brake hydraulic pressure control system of a vehicle.

Embodiments of the invention will be described with reference to FIG. 1 to FIG. 6. In FIG. 1, a vehicle V includes right and left front wheels WA, WB to which a driving force of an engine E is transmitted via a transmission T, and right and left rear wheels WC, WD. A brake pedal 11 is operated by a driver and is connected to a master cylinder M. Also, wheel brakes BA, BB, BC, BD, which are operated by the action of brake fluid, are provided in the front wheels WA, WB and the rear wheels WC, WD, respectively. The master cylinder M is connected to the individual wheel brakes BA to BD via a hydraulic pressure adjusting unit 12. The hydraulic pressure adjusting unit 12 can adjust (can increase or decrease) the brake fluid pressures acting on the wheel brakes BA to BD individually in order to prevent the wheels from being locked during braking.

The operation of the hydraulic pressure adjusting unit 12 is controlled by a hydraulic pressure control apparatus 13. Signals from wheel velocity sensors SA, SB, SC, SD which are provided individually for the right and left front wheels WA, WB and the right and left rear wheels WC, WD and a signal from a pressure sensor SP that detects a brake fluid pressure output from the master cylinder M are input into the hydraulic pressure control apparatus 13. The hydraulic pressure control apparatus 13 controls the operation of the hydraulic pressure adjusting unit 12 based on the signals from the respective sensors SA to SD, SP.

Figure 2:
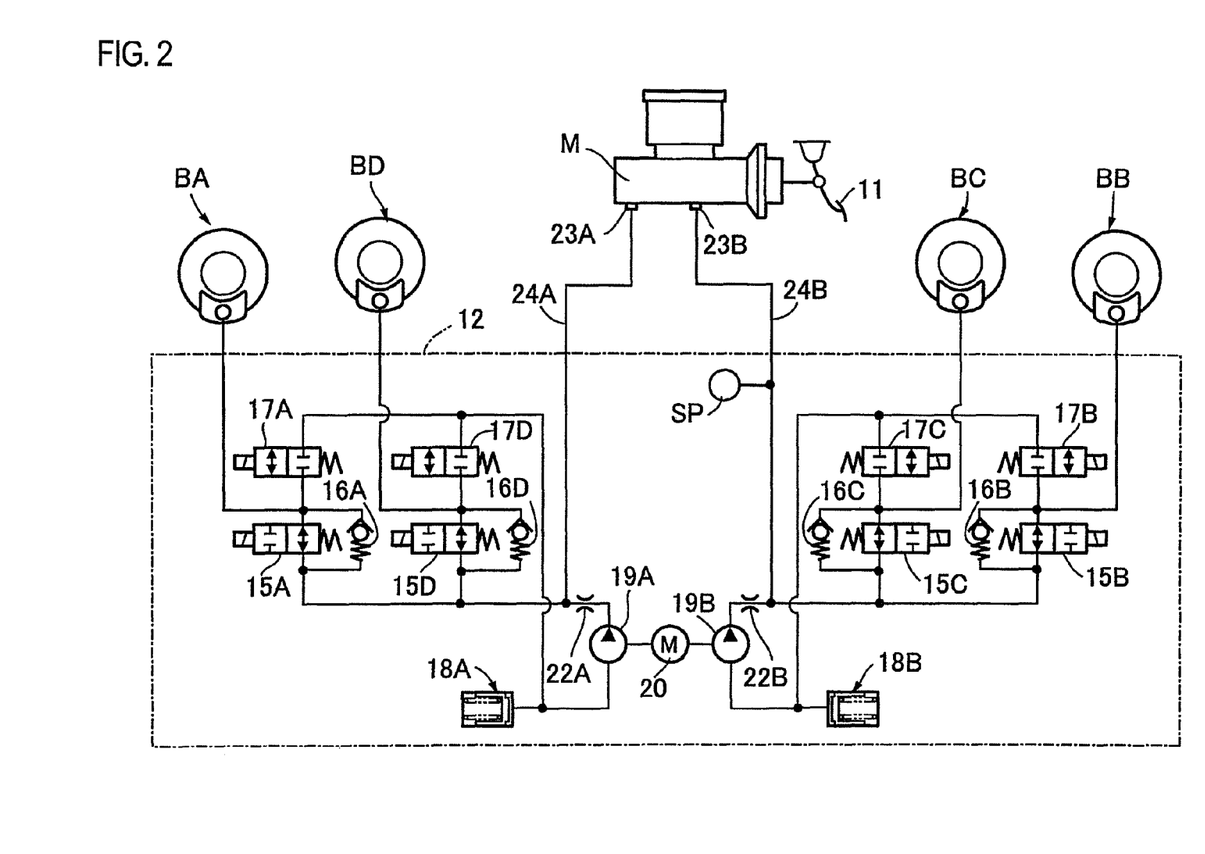
FIG. 2 is a hydraulic pressure circuit diagram showing the configuration of a hydraulic pressure adjusting unit.

In FIG. 2, the hydraulic pressure adjusting unit 12 includes normally open solenoid valves 15A to 15D, check valves 16A to 16D, normally closed solenoid valves 17A to 17D, a first reservoir 18A, a second reservoir 18B, a first pump 19A, a second pump 19B, an electric motor 20, a first orifice 22A, and a second orifice 22B. The normally open solenoid valves 15A to 15D correspond to the wheel brake BA for the left front wheel WA, the wheel brake BB for the right front wheel WB, the wheel brake BC for the left rear wheel WC, and the right rear wheel WD for the left rear wheel WC, respectively. The check valves 16A to 16D are connected in parallel to the normally open solenoid valves 15A to 15D, respectively. The normally closed solenoid valves 17A to 17D correspond to the wheel brakes BA to BD, respectively. Of first and second output ports 23A, 23B which are provided on the master cylinder M, the first reservoir 18A corresponds to a first output hydraulic pressure line 24A which continues to the first output port 23A. The second reservoir 18B corresponds to a second output hydraulic pressure line 24B which continues to the second output port 23B of the master cylinder M. Suction sides of the first and second pumps 19A, 19B are connected to the first and second reservoirs 18A, 18B, respectively. Discharge sides of the first and second pumps 19A, 19B are connected to the first and second output hydraulic pressure lines 24A, 24B, respectively. The electric motor 20 is shared by the first and second pumps 19A, 19B and drives the first and second pumps 19A, 19B. The first and second orifices 22A, 22B are provided between the discharge sides of the first and second pumps 19A, 19B and the master cylinder M, respectively. The pressure sensor SP is provided on one of the first and second hydraulic pressure lines 24A, 24B. For example, in FIG. 2, the pressure sensor SP is connected to the second output hydraulic pressure line 24B.

The normally open solenoid valves 15A, 15D are provided between the first output hydraulic pressure line 24A and the wheel brake BA for the left front wheel WA and between the first output hydraulic pressure line 24A and the wheel brake BD for the right rear wheel WD, respectively. The normally open solenoid valves 15B, 15C are provided between the second output hydraulic pressure line 24B and the wheel brake BB for the right front wheel WB and the second output hydraulic pressure line 24B and the wheel brake BC for the left rear wheel WC, respectively.

Also, the check valves 16A to 16D are connected in parallel to the corresponding normally open solenoid valves 15A to 15D, respectively, so as to allow the brake fluid to flow from the corresponding wheel brakes BA to BD to the master cylinder M.

The normally closed solenoid valves 17A, 17D are provided between the wheel brake BA for the left front wheel WA and the first reservoir 18A and between the wheel brake BD for the right rear wheel WD and the first reservoir 18A, respectively. The normally closed solenoid valves 17B, 17C are provided between the wheel brake BB for the right front wheel WB and the second reservoir 18B and between the wheel brake BC for the left rear wheel WC and the second reservoir 18B, respectively.

In the hydraulic pressure adjusting unit 12 configured as described above, under a normal braking operation where there is no possibility that each wheel is locked, communications are established between the master cylinder M and the wheel brakes BA to BD, while communications between the wheel brakes BA to BD and the first and second reservoirs 18A, 18B are cut off. That is, the normally open solenoid valves 15A to 15D are demagnetized to be opened, while the normally closed solenoid valves 17A to 17B are demagnetized to be closed. A brake fluid pressure output from the first output port 23A of the master cylinder M is applied to the wheel brake BA for the left front wheel WA via the normally open solenoid valve 15A and is also applied to the wheel brake BD for the right rear wheel WD via the normally open solenoid valve 15D. Also, a brake fluid pressure output from the second output port 23B of the master cylinder M is applied to the wheel brake BB for the right front wheel WB via the normally open solenoid valve 15B and is also applied to the wheel brake BC for the left rear wheel WC via the normally open solenoid valve 15C.

When any of the wheels is about to lock up under the normal braking operation, antilock braking control is executed. That is, the hydraulic pressure adjusting unit 12 cuts off the communications between the master cylinder M and the wheel brakes BA to BD at a portion which corresponds to the wheel which is about to lock up, while the hydraulic pressure adjusting unit 12 establishes the communications between the wheel brakes BA to BD and the reservoirs 18A, 18B. That is, the normally open solenoid valve of the normally open solenoid valves 15A to 15D which corresponds to the wheel which is about to lock up is magnetized to be closed, while the normally closed solenoid valve of the normally closed solenoid valves 17A to 17D which corresponds to the wheel which is about to lock up is magnetized to be opened. Thereby, a part of the brake fluid pressure for the wheel which is about to lock up is absorbed by the first reservoir 18A or the second reservoir 18B, and the brake fluid pressure for the wheel which is about to lock up is reduced.

In addition, when holding the brake fluid pressure at a constant level, the hydraulic pressure adjusting unit 12 isolates the wheel brakes BA to BD from the master cylinder M and the reservoirs 18A, 18B. That is, the normally open solenoid valves 15A to 15D are magnetized to be closed, while the normally closed solenoid valves 17A to 17D are demagnetized to be closed. Furthermore, when the brake fluid pressure(s) are increased, the normally open solenoid valves 15A to 15D are demagnetized to be opened, while the normally closed solenoid valves 17A to 17D are demagnetized to be closed.

By controlling the demagnetization/magnetization of the respective normally open solenoid valves 15A to 15D and the respective normally closed solenoid valves 17A to 17D in the way described above, it is possible to brake the vehicle with good efficiency without any of the wheels locking up.

Meanwhile, during the antilock braking control, the electric motor 20 rotates to operate, and the first and second pumps 19A, 19B are driven in association with the operation of the electric motor 20. Therefore, the brake fluid absorbed by the first and second reservoirs 18A, 18B is suctioned into the first and second pumps 19A, 19B. Then, the brake fluid so suctioned in is refluxed to the first and second output hydraulic pressure lines 24A, 24B. By the reflux of the brake fluid in this way, the brake fluid can be returned to the master cylinder M side. Moreover, the pulsation of discharge pressures of the first and second pumps 19A, 19B is suppressed by the action of the first and second orifices 22A, 22B. Therefore, the operation feeling of the brake pedal 11 is adversely affected by the reflux of the brake fluid.

Figure 3:
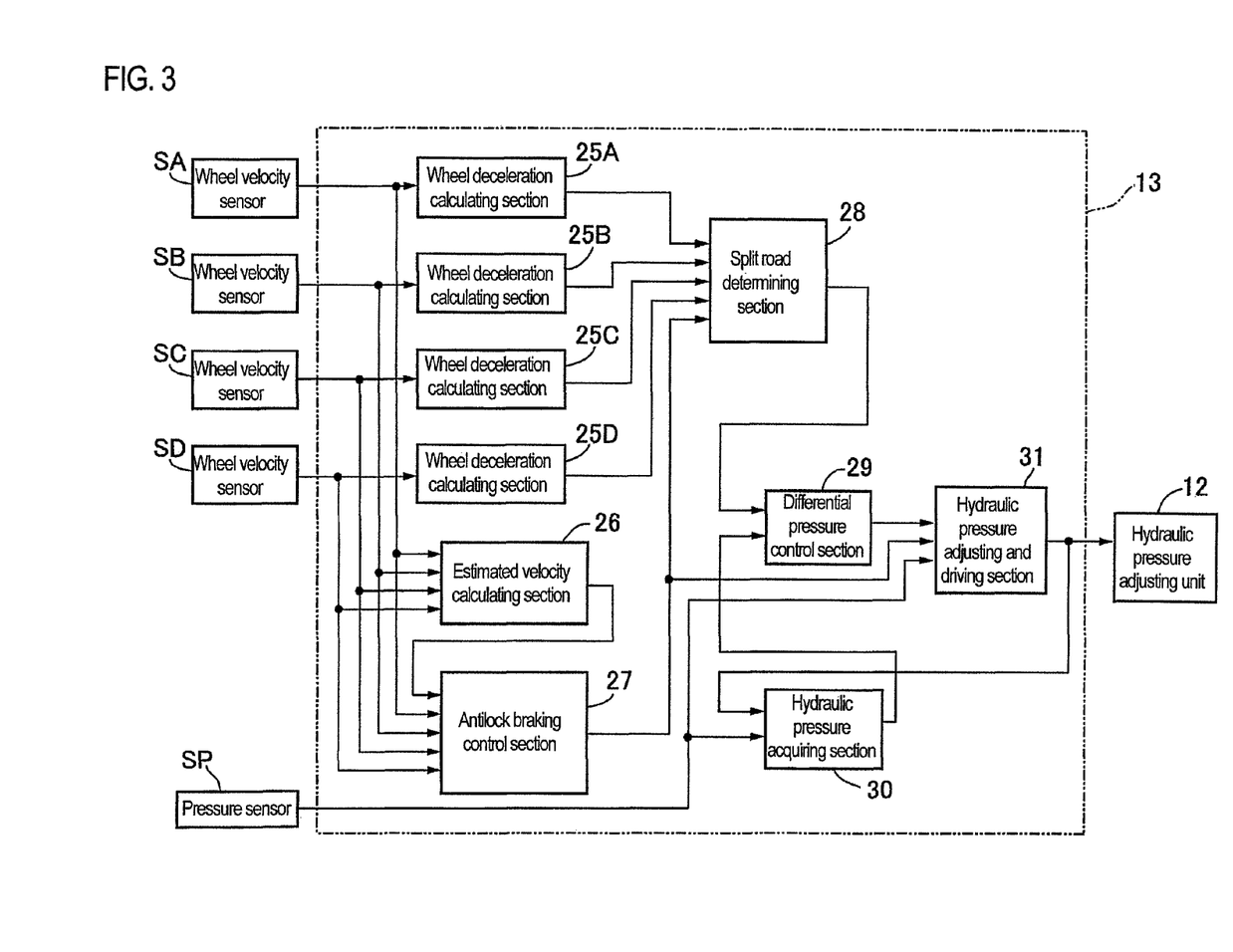
FIG. 3 is a block diagram showing the configuration of a vehicle brake hydraulic pressure control apparatus.

In FIG. 3, in addition to execution of the antilock braking control as described above, the hydraulic pressure control apparatus 13 which controls the operation of the hydraulic pressure adjusting unit 12 can execute differential pressure control to control so that a difference between the brake fluid pressures of the wheel brakes BA, BB for the right and left front wheels WA, WB and a difference between the brake fluid pressures of the wheel brakes BC, BD for the right and left rear wheels WC, WD to fall within a permissible differential pressure. The hydraulic pressure control apparatus 13 includes wheel deceleration calculating sections 25A, 25B, 25C, 25D, an estimated velocity calculating section 26, an antilock braking control section 27, a split road determining section 28, a differential pressure control section 29, a hydraulic pressure acquiring section 30, and a hydraulic pressure adjusting and driving section 31. The antilock braking control section 27 determines as to whether or not the antilock braking control should be executed. Also, the antilock braking control section 27 calculates a hydraulic pressure control amount during the antilock braking control. The split road determining section 28 determines as to whether or not the road surfaces which the right and left wheels WA, AB; WC, WD are in contact with constitute a split road in which coefficients of friction of the right and left mad surfaces are largely different from each other. The differential pressure control section 29 calculates the hydraulic pressure control amount by which the differential pressure control is executed which controls the difference between the brake fluid pressures of the wheel brakes BA, BB for the right and left front wheels WA, WB which are on the same axis and between the brake fluid pressures of the wheel brakes BC, BD for the right and left rear wheels WC, WD which are also on the same axis. The hydraulic pressure acquiring section 30 acquires the brake fluid pressures of the wheel brakes BA, BB for the front wheels WA, WB and the brake fluid pressures of the wheel brakes BC, BD for the rear wheels WC, WD. The hydraulic pressure adjusting and driving section 31 operates the hydraulic pressure adjusting unit 12.

The wheel deceleration calculating sections 25A, 25B, 25C, 25D calculate respective wheel decelerations (negative accelerations) which are expressed by negative values, from wheel velocities which are acquired by the wheel velocity sensors SA to SD. The estimated velocity calculating section 26 calculates an estimated vehicle body velocity based on the wheel velocities which are acquired by the wheel velocity sensors SA to SD. Also, the antilock braking control section 27 determines as to whether or not the antilock braking control should be executed, based on the wheel velocities acquired by the wheel velocity sensors SA to SD and the estimated vehicle body velocity calculated by the estimated velocity calculating section 26. Also, the antilock braking control section 27 calculates the hydraulic pressure control amount during the antilock braking control.

The split road determining section 28 determines as to whether or not road surfaces constitute the split road when the antilock braking control section 27 starts the antilock braking control for either of the front wheels WA, WB and the rear wheels WC, WD. If, at a time when the antilock braking control for at least one of the right and left front wheels WA, WB is started or at a time when the antilock braking control for at least one of the right and left rear wheels WC, WD is started, a maximum value of the wheel decelerations of the front wheels WA, WB and rear wheels (a wheel deceleration of the wheel which is the least decelerated) is equal to or larger than a first predetermined value and a difference between the wheel decelerations of the right and left front wheels WA, WB or right and left rear wheels WC, WD which are in an antilock braking control state is equal to or larger than a second predetermined value, the split road determining section 28 determines that the road surfaces constitute the split road.

The hydraulic pressure acquiring section 30 acquires the brake fluid pressures of the wheel brakes BA, BB for the front wheels WA, WB and the wheel brakes BC, BD for the rear wheels WC, WD based on an output hydraulic pressure of the master cylinder M and driving currents of the solenoid valves, which make up a part of the hydraulic pressure adjusting unit 12, that is, the normally open solenoid valves 15A to 15D and the normally closed solenoid valves 17A to 17D. The output hydraulic pressure of the master cylinder M is input from the pressure sensor SP to the hydraulic pressure acquiring section 30. Signals indicating the driving currents of the normally open solenoid valves 15A to 15D and the normally closed solenoid valves 17A to 17D are input from the hydraulic pressure adjusting and driving section 31 to the hydraulic pressure acquiring section 30.

When the split road determining section 28 determines that the road surfaces constitute the split road, the differential pressure control section 29 determines brake fluid pressures based on the brake fluid pressures of the wheel brakes BA, BB, BC, BD, which are acquired by the hydraulic pressure acquiring section 30, so that a difference between the brake fluid pressure of the wheel brakes BA, BB; BC, BD for the right and left wheels WA, WB; WC, WD, which are on the same axis, becomes equal to or smaller than the permissible differential pressure.

The hydraulic pressure adjusting and driving section 31 drives the hydraulic pressure adjusting unit 12 based on the output hydraulic pressure of the master cylinder M, which is detected by the pressure sensor SP, the results of the determination made by the antilock braking control section 27, the hydraulic pressure controlling amount calculated by the antilock braking control section 27, and the brake fluid pressures determined by the differential pressure control section 29.

Figure 4A:
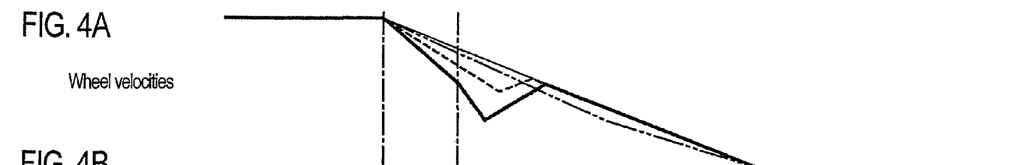
FIGS. 4A to 4D are diagrams showing one example of changes, with respect to time, of wheel velocities, a maximum wheel deceleration, a difference in wheel deceleration between right and left front wheels, and brake fluid pressures while the vehicle is running mainly on a road surface whose coefficient of friction is high
Figure 4B:
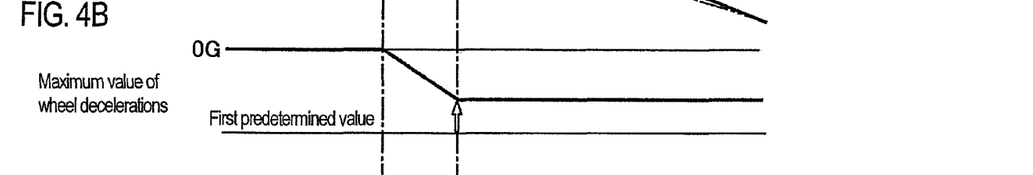

It is assumed that the braking operation is performed while the vehicle is running mainly on a road surface having a high coefficient of friction in a state where a frictional force between the tire on the right front wheel WA and the road surface is different from that between left front wheel WB and the road surface (for example, (i) the case where one of the tires on the right and left front wheels WA, WB wears more than the other of the tires, (ii) the case where temperatures of brake pads of the wheel brakes BA, BB for the right and left front wheels WA, WB differ from each other, whereby frictional forces of the brake pads of the wheel brakes BA, BB differ from each other, or the like). In this case, the wheel velocities, the maximum wheel deceleration, the difference in wheel deceleration between the right and left front wheels, and the brake fluid pressures change with time as shown in FIGS. 4A to 4D, for example. A wheel velocity (indicated by a solid line) of either of the right and left front wheels WA, WB which has a stronger frictional force, a wheel velocity (indicated by a broken line) of the other of the right and left front wheels WA, WB which has a weaker frictional force, and wheel velocities (indicated by a chain double-dashed line) of the rear wheels WC, WD change as shown in FIG. 4A in response to the braking operation being performed at a time t1. In response to the changes, the maximum wheel deceleration changes as shown in FIG. 4B. For the purpose of facilitating understanding of the description, the change in the maximum wheel deceleration is shown by a polygonal graph. However, in reality, as will be shown in FIG. 6B, which will be described later, the maximum wheel deceleration changes in a smooth fashion.

Figure 4C:
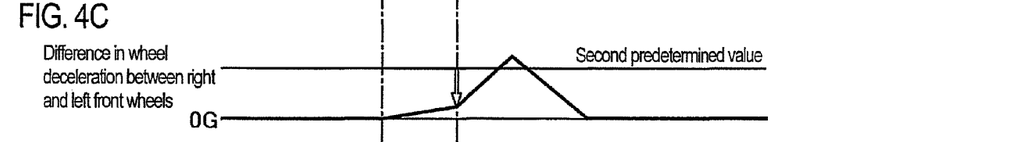
Figure 4D:
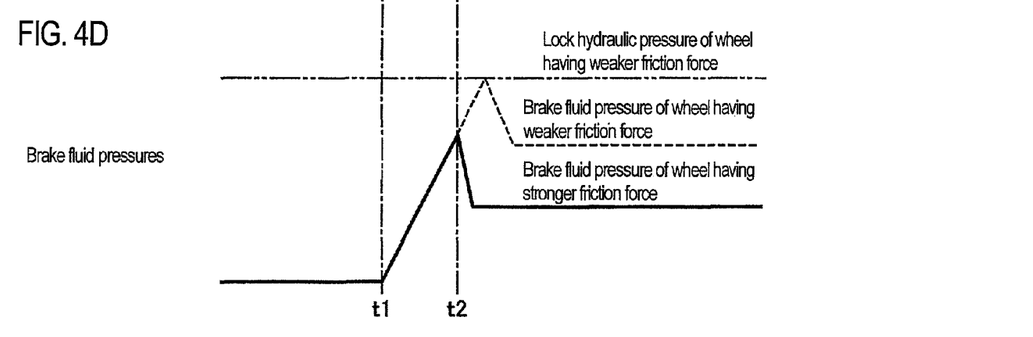

When the difference in wheel deceleration between the right and left front wheels WA, WB changes as shown in FIG. 4C, the antilock braking control is started for the wheel brake for either of the right and left front wheels WA, WB, which has the stronger frictional force, at a time t2 when the brake fluid pressure of the front wheel having the stronger frictional force reaches a lock hydraulic pressure (a brake fluid pressure at which reduction of the pressure is started in association with the antilock braking control). As a result, as shown in FIG. 4D, the brake fluid pressure of the wheel brake for the front wheel having the stronger frictional force is started to be reduced from the time t2.

The split road determining section 28 determines, at the time t2, as to whether or not the road surfaces constitute the split road. More specifically, the split mad determining section 28 determines that the road surfaces constitute the split road when the maximum wheel deceleration of the wheel decelerations of the front wheels WA, WB and the rear wheels WC, WD (a wheel deceleration of the wheel which is the least decelerated) is equal to or larger than the first predetermined value and the difference in wheel deceleration between the right and left front wheels WA, WB is equal to or larger than the second predetermined value. There may be a case where the maximum wheel deceleration of the wheel decelerations of the wheels WA, WB, WC, WD (the wheel deceleration of the wheel which is the least decelerated) is equal to or larger than the first predetermined value as shown in FIG. 4B due to that the vehicle is running mainly on a road surface having a high coefficient of friction in a state where a frictional force between the tire on the right front wheel WA and the mad surface is different from that between the tire on the left front wheel WB and the road surface. However, the difference in wheel deceleration between the right and left front wheels WA, WB does not become equal to or larger than the second predetermined value as shown in FIG. 4C. Therefore, the split road determining section 28 does not erroneously determine that the road surfaces constitute the split mad. Accordingly, the differential pressure control is not started at the time t2, and the brake fluid pressure of the wheel brake for the front wheel having a weaker frictional force is never reduced until the brake fluid pressure reaches the lock brake fluid pressure of the front wheel having the weaker frictional force.

Figure 5A:
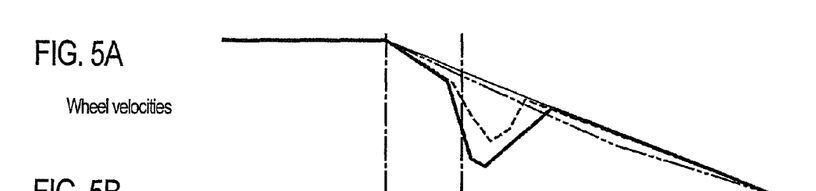
FIGS. 5A to 5D are diagrams showing one example of changes, with respect to time, of the wheel velocities, the maximum wheel deceleration, the difference in wheel deceleration between the right and left front wheels, and the brake fluid pressures while the vehicle is running mainly on a road surface whose coefficient of friction is low.
Figure 5B:
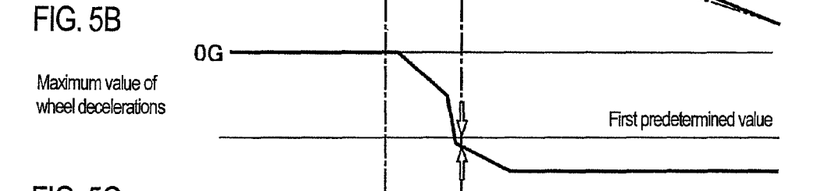

Next, it is assumed that the braking operation is performed while the vehicle is running mainly on a road surface having a low coefficient of friction in a state where a frictional force between the tire on the right front wheel WA and the road surface is different from that between the tire on the left front wheel WB and the road surface (for example, (i) the case where one of the tires on the right and left front wheels WA, WB wears more than the other of the tires, (ii) the case where temperatures of brake pads of the wheel brakes BA, BB for the right and left front wheels WA, WB differ from each other, whereby frictional forces of the brake pads of the wheel brakes BA, BB differ from each other, or the like). In this case, the wheel velocities, the maximum wheel deceleration, the difference in wheel deceleration between the right and left front wheels, and the brake fluid pressures change with time as shown in FIGS. 5A to 5D, for example. A wheel velocity (indicated by a solid line) of either of the right and left front wheels WA, WB which has a stronger frictional force, a wheel velocity (indicated by a broken line) of the other of the right and left front wheels WA, WB which has a weaker frictional force, and wheel velocities (indicated by a chain double-dashed line) of the rear wheels WC, WD change as shown in FIG. 5A in response to the braking operation being performed at a time t3. In response to the changes, the maximum wheel deceleration changes as shown in FIG. 5B. For the purpose of facilitating understanding of the description, the change in the maximum wheel deceleration is shown by a polygonal graph However, in reality, as will be shown in FIG. 6B, which will be described later, the maximum wheel deceleration changes in the smooth fashion.

Figure 5C:
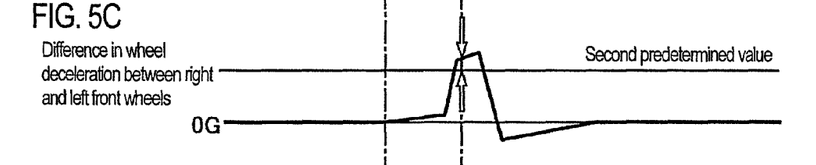
Figure 5D:
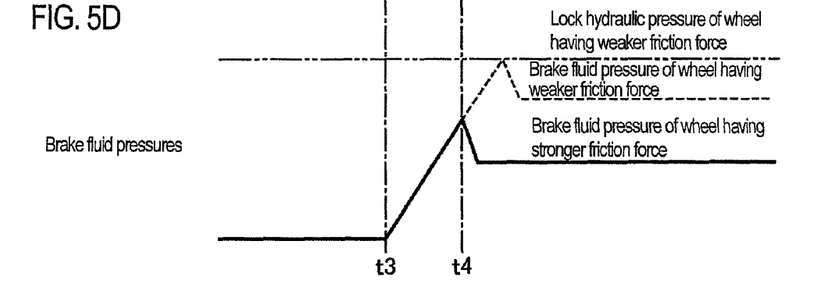
Figures 6A, 6B:
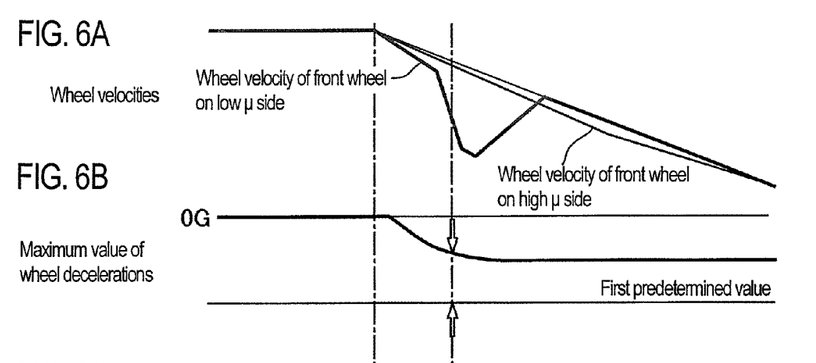
FIGS. 6A to 6D are diagrams showing one example of changes, with respect to time, of the wheel velocities, the maximum wheel deceleration, the difference in wheel deceleration between the right and left front wheels, and the brake fluid pressures while the vehicle is running mainly on a split mad.
Figure 6C:
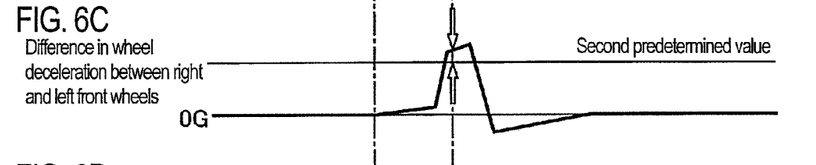
Figure 6D:
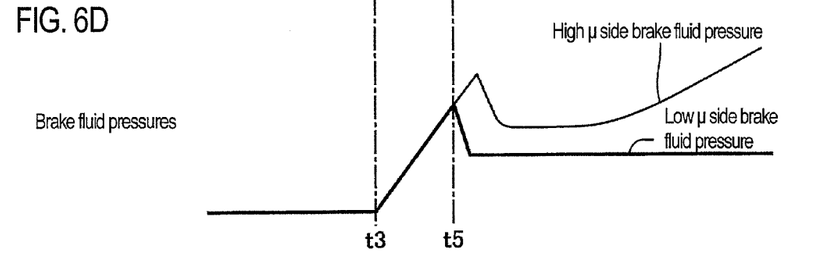

When the difference in wheel deceleration between the right and left front wheels WA, WB changes as shown in FIG. 5C, the antilock braking control is started for the wheel brake of either of the right and left front wheels WA, WB, which has the stronger frictional force, at a time t4 when the brake fluid pressure of the front wheel having the stronger frictional force reaches the lock hydraulic pressure (the brake fluid pressure at which reduction of the pressure is started in association with the antilock braking control). As a result, as shown in FIG. 5D, the brake fluid pressure of the wheel brake of the front wheel having the stronger frictional force is started to be reduced from the time t4.

The split road determining section 28 determines, at the time t4, as to whether or not the road surfaces constitute the split road. More specifically, the split road determining section 28 determines that the road surfaces constitute the split road when the maximum wheel deceleration of the wheel decelerations of the front wheels WA, WB and the rear wheels WC, WD (a wheel deceleration of the wheel which is the least decelerated) is equal to or larger than a first predetermined value and the difference in wheel deceleration between the right and left front wheels WA, WB is equal to or larger than the second predetermined value. There may be a case where the difference in wheel deceleration between the right and left front wheels WA, WB becomes equal to or larger than the second predetermined value as shown in FIG. 5C due to that the vehicle is running mainly on a road surface having a low coefficient of friction in a state where the fictional force between the tire on the right front wheel WA and the road surface is different from that between the left front wheel WB and the road surface. However, the maximum wheel deceleration of the wheel decelerations of the wheels WA, WB, WC, WD (the wheel deceleration of the wheel which is the least decelerated) does not become equal to or larger than the first predetermined value as shown in FIG. 5B. Therefore, the split road determining section 28 does not erroneously determine that the mad surfaces constitute the split mad. Accordingly, the differential pressure control is not started at the time t4, and the brake fluid pressure of the wheel brake of the front wheel having a weaker frictional force is never reduced until the brake fluid pressure reaches the lock brake fluid pressure of the front wheel having the weaker frictional force.

Also, the split mad determining section 28 may determine that the road surfaces constitute the split road when the maximum wheel deceleration of the wheel decelerations of the front wheels WA, WB and the rear wheels WC, WD (the wheel deceleration of the wheel which is the least decelerated) is equal to or larger than the first predetermined value and the difference in wheel deceleration between the right and left rear wheels WC, WD is equal to or larger than the second predetermined value, when the antilock braking control is started for either of the right and left rear wheels WC, WD. The second predetermined value for use in determination, with respect to the front wheels, as to whether or not the road surfaces constitute the split mad may be different from the second predetermined value for use in determination, with respect to the rear wheels, as to whether or not the road surfaces constitute the split road.

Next, the effect of this embodiment will be described. The hydraulic pressure control apparatus 13 includes the split road determining section 28, which determines as to whether or not the road surfaces which the front wheels WA, WB and the rear wheels WC, WD are in contact constitute the split road in which the coefficients of friction of the right and left road surfaces are largely different from each other. If, at a time when the antilock braking control for at least one of the right and left front wheels WA, WB is started or at a time when the antilock braking control for at least one of the right and left rear wheels WC, WD is started, a maximum value of the wheel decelerations of the front wheels WA, WB and rear wheels (a wheel deceleration of the wheel which is the least decelerated) is equal to or larger than the first predetermined value and the difference between the wheel decelerations of the right and left front wheels WA, WB or right and left rear wheels WC, WD which are in the antilock braking control state is equal to or larger than the second predetermined value, the split road determining section 28 determines that the road surfaces constitute the split mad.

It is assumed that the wheel velocities, the maximum wheel deceleration, the difference in wheel deceleration between the right and left front wheels, and the brake fluid pressures change with time as shown in FIGS. 6A to 6D, for example, when the brake operation is performed while the vehicle is running. In this case, if it is recognized that the maximum wheel deceleration of the wheel decelerations of the front wheels WA, WB and the rear wheels WC, WD (the wheel deceleration of the wheel which is the least decelerated) is equal to or larger than the first predetermined value at a time t5 when the antilock braking control is started for either of the right and left front wheels WA, WB, which is in contact with a mad surface having a low coefficient of fiction and if it is recognized that the difference in wheel deceleration between the right and left front wheels which are in the antilock braking control state is equal to or larger than the second predetermined value, the split road determining section 28 determines that the road surfaces constitute the split road. Then, in this state, the difference between the brake fluid pressures of the wheel brakes BA, BB for the right and left front wheels WA, WB is controlled.

As a result, it is prevented that the split road determining section 28 erroneously determines that the road surfaces constitute the split road due to that there is a difference in braking force between the right and left wheel brakes BA, BB; BC, BD. Thereby, it can be prevented that the difference between the brake fluid pressures of the right and left wheel brakes BA, BB; BC, BD is restricted based on the erroneous determination, and it makes possible to prevent deterioration in the braking performance of the vehicle.

The embodiment of the invention has been described heretofore. However, the invention is not limited thereto. Hence, various changes in design may be made based on the above embodiment

What is claimed is:
1. A vehicle brake hydraulic pressure control apparatus comprising:
a hydraulic pressure adjusting unit that individually adjusts brake fluid pressures acting on wheel brakes for right and left front wheels and right and left rear wheels;
a wheel deceleration calculating section that individually calculates, as negative values, wheel decelerations of the front and rear wheels;
a split road determining section that determines as to whether or not road surfaces which the right wheels and the left wheels are in contact with constitute a split road in which coefficients of friction of the road surfaces are different from each other, wherein
in a state where the split road determining section determines during execution of antilock braking control that the road surfaces constitute the split road, the hydraulic pressure adjusting unit is controlled so that differential pressures between the brake fluid pressures of the right and left wheel brakes are equal to or less than a permissible differential pressure,
if, at a time when the antilock braking control for at least one of the right and left front wheels is started or at a time when the antilock braking control for at least one of the right and left rear wheels is started,
  (i) a maximum value of the wheel decelerations of the front and rear wheels calculated by the wheel deceleration calculating section is equal to or larger than a first predetermined value and
  (ii) a difference between the wheel decelerations of the right and left front wheels or the right and left rear wheels which are in an antilock braking control state is equal to or larger than a second predetermined value,
the split road determining section determines that the road surfaces constitute the split road.

2. The vehicle brake hydraulic pressure control apparatus of claim 1, wherein when the split road determining section determines that the road surfaces constitute the split road, a differential pressure control section determines brake fluid pressures based on the brake fluid pressures of the right and left front wheels and right and left rear wheels, which are acquired by the hydraulic pressure acquiring unit, so that a difference between brake fluid pressure of the wheel brakes of the right and left front wheels and right and left rear wheels, which are on the same axis, becomes equal to or smaller than a permissible differential pressure.

3. The vehicle brake hydraulic pressure control apparatus of claim 1, wherein when the difference in wheel deceleration between the right and left front wheels changes, the antilock braking control is started for the wheel brake for either of the right and left front wheels, which has a stronger frictional force, at a time when the brake fluid pressure of the front wheel having the stronger frictional force reaches a lock hydraulic pressure.

* * * * *